United States Patent [19]

Thomas et al.

[11] 4,295,095
[45] Oct. 13, 1981

[54] APPARATUS AND METHOD FOR DETECTING THE LOCATION OF METALLIC OBJECTS HAVING ALTERNATING CURRENT PASSING THERETHROUGH

[75] Inventors: Richard C. Thomas, Cramlington; Stewart M. Pegler, Wideopen; Paul B. Cordes, North Shields, all of England

[73] Assignee: British Gas Corporation, London, England

[21] Appl. No.: 22,100

[22] Filed: Mar. 20, 1979

[30] Foreign Application Priority Data

Jan. 29, 1979 [GB] United Kingdom ............... 03083/79

[51] Int. Cl.³ .................... G01V 3/11; G01V 3/165
[52] U.S. Cl. ................................................ 324/326
[58] Field of Search ............... 324/326, 329, 67, 243, 324/263, 345

[56] References Cited

U.S. PATENT DOCUMENTS

| | | | |
|---|---|---|---|
| 1,745,074 | 2/1926 | Fessenden | 324/67 X |
| 3,745,452 | 7/1973 | Osburn et al. | 324/54 |
| 3,907,136 | 9/1975 | Christides et al. | 324/67 X |
| 4,085,360 | 4/1978 | Howell | 324/326 |
| 4,091,322 | 5/1978 | Stankoff | 324/67 X |
| 4,134,061 | 1/1979 | Gudgel | 324/326 X |

FOREIGN PATENT DOCUMENTS

| | | | |
|---|---|---|---|
| 2329008 | 6/1977 | France | 324/326 |
| 1299183 | 12/1972 | United Kingdom . | |
| 1509380 | 5/1978 | United Kingdom . | |
| 1509914 | 5/1978 | United Kingdom . | |
| 2006438 | 5/1979 | United Kingdom | 324/67 |

Primary Examiner—Gerard R. Strecker
Attorney, Agent, or Firm—Watson, Cole, Grindle & Watson

[57] ABSTRACT

A method of detection of inaccessible metallic objects such as gas, electricity, water or telecommunications systems (lines) through which an alternating current is flowing, comprises making at least three spatially separated measurements of the magnetic field associated with the current. Signals derived from the measurements are compared in a detector which gives an output indication when the signals derived from the measurements at the two outer locations are equal and each less than the signal derived from the measurement at the intermediate location.

A suitable sensing device has four equally spaced pickup coils and operates at a frequency of 43KHz. The alternating current detected in the metallic objects may be induced by a separate transmitter.

16 Claims, 3 Drawing Figures

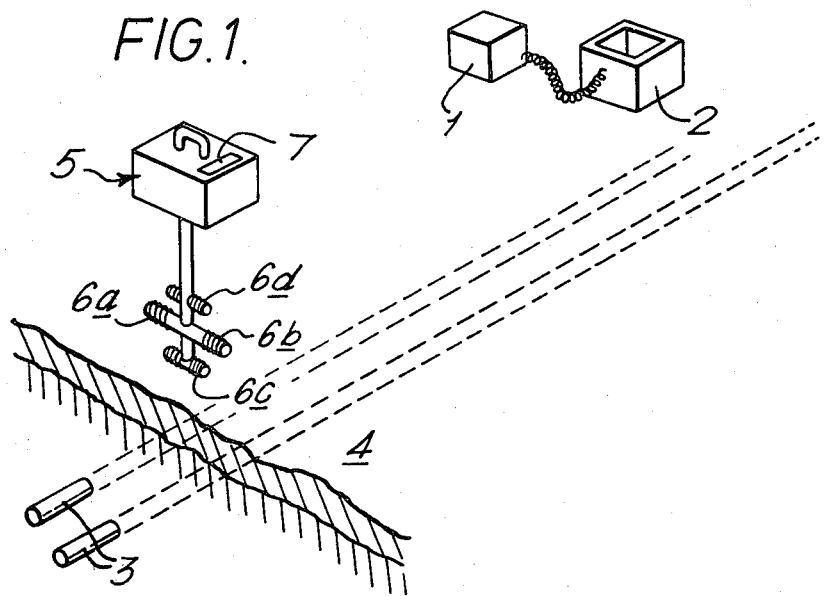
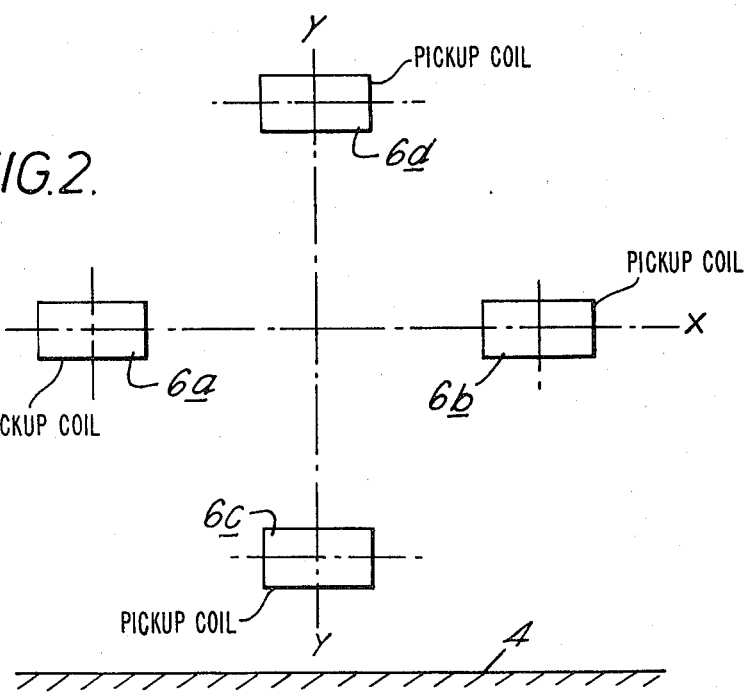

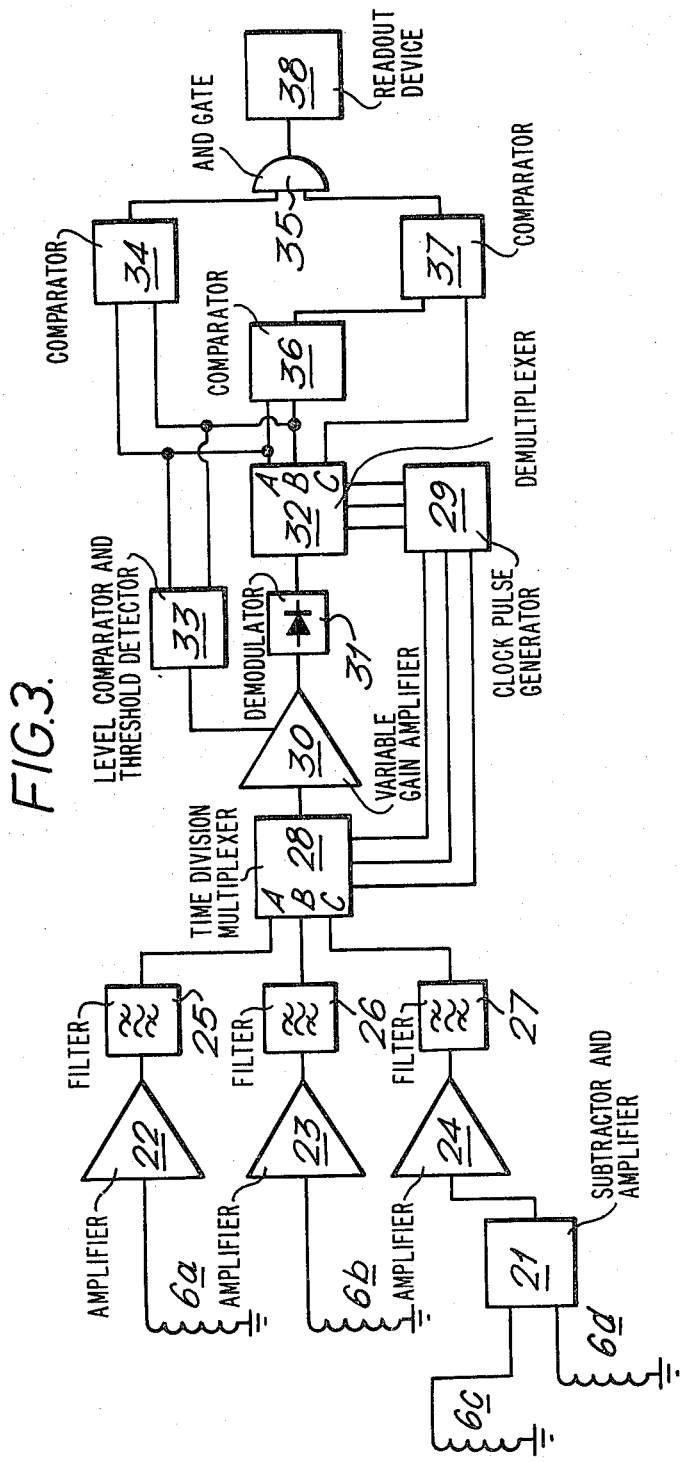

APPARATUS AND METHOD FOR DETECTING THE LOCATION OF METALLIC OBJECTS HAVING ALTERNATING CURRENT PASSING THERETHROUGH

DESCRIPTION

BACKGROUND OF THE INVENTION

1. Field of the Invention

This invention relates to methods of and apparatus for the detection of inaccessible metallic objects, and, in particular, buried distribution lines for gas, water, electricity, telecommunications and the like.

2. The Prior Art

In order to facilitate the replacement and repair of buried distribution systems (lines) it is desirable to have a rapid and simple method of accurately locating their position. Most buried distribution systems are constructed either of ferrous or nonferrous metals, either alone or in combination with nonmetallic materials. The metal components of these systems frequently carry alternating currents which generate magnetic fields which can be detected. Alternatively, currents can be induced in these metals by an external transmitter and the currents detected to demonstrate the presence of the distribution lines.

One method for the detection of buried metallic objects is described in UK Pat. No. 1,299,183. A transmitter having an aerial consisting of a coil wound on a ferrite rod radiates a signal which is preferably at a frequency of between 100 Hz and 10 KHz. This signal energizes buried metallic objects which modify the pattern of the field. A receiver is tuned to the same frequency and has a similar ferrite rod aerial. This aerial, however, has its axis perpendicular to that of the transmitting aerial and is disposed so that it is not energized by the direct signal.

A second method, described in UK Pat. No. 1,509,380, has a number of coplanar pickup coils whose axes define the corners of a polygon on the ground. A receiver compares the phases of the signals induced in these coils and, from their relative phases, determines whether or not a cable or pipe is buried below that polygon. This receiver may be tuned to line power frequencies, since even gas and water pipes usually carry such currents resulting from stray earth return currents. Alternatively, an external transmitter may be used, and the receiver tuned to its radiated signal.

In UK Pat. No. 1,509,914 there is described yet another method for the detection of buried systems. In this method an array of detector coils scans the surface to detect the presence of a subterranean source of radiation by measuring the change in signal strength, a maximum indicating the position of the source.

One difficulty with scanning methods for the detection of buried radiators is that various metallic objects carry different currents and thus create fields of vastly different strengths. For example, an electricity line may carry a 50 Hz current ten thousand times greater than the stray earth return current in a water pipe. With an externally actuated system, the current induced in an insulated pipe may differ substantially from that induced in a bare pipe which is in contact with the soil. These different field strengths create problems with detector apparatus and it is often necessary to make several scanning passes, adjusting the gain before detecting the field maximum which indicates the position of the buried lines.

It is not possible to use a simple automatic gain control technique to overcome this variation in signal strength, since this would also mask the variations in signal from individual radiators which it is desired to detect. A multichannel detector system has, therefore, been devised to provide an instantaneous indication of the position of a maximum in an electromagnetic radiation field by comparison of the output levels of the different channels. Such a system is amenable to the application of automatic gain control which thus facilitates and speeds operation.

SUMMARY OF THE INVENTION

Existing externally excited detection systems usually operate in one of two frequency bands, either 0.5 to 10 KHz or 80 to 120 KHz. We have found, however, that at relatively low frequencies, bare metallic objects give a greater response, whilst at high frequencies, coated and insulated conductors are more readily energized. A more uniform response is obtained in the 20-80 KHz band, and, within this band, the range 40-50 KHz is optimal. These frequencies have the further advantage that background electrical noise is also less significant than at other frequencies which might be employed.

With externally excited systems, the alternating field radiated by the transmitter approximates that of a simple dipole. Usually the axis of this dipole will be horizontal. Where there is more than one distribution system buried in the ground in the vicinity of the transmitter, alternating currents will be induced in each system, and these currents will be in phase with each other. The fields radiated from the systems due to these induced currents will be additive and, dependent on the distance between the adjacent systems and the distance from the radiating systems to the receiver, the detector may indicate only the presence of a single false system at a position between the two real systems. We have found that by arranging a number of detector aerials at different heights above the ground and suitably combining their outputs, the detection of buried distribution systems may be undertaken with greater speed and accuracy. The skill required by the operator in interpreting the signal given by a detector embodying a suitable arrangement of detector aerials is reduced.

According to one aspect of the present invention there is provided an apparatus for the detection of a metallic object through which an alternating current is passing which apparatus comprises detector means sensitive to an alternating magnetic field associated with the current and adapted to make at least three spatially separated measurements of the strength of the field, first comparator means to determine whether the magnitudes of the field strengths in a given two of the measurements are equal, second comparator means to determine whether the magnitude of the field strength in the third of the measurements is greater or less than that of one of the other two masurements, and indicator means to provide an output indication of any location at which the field strength magnitudes of the given two measurements are equal and that of the third measurement is greater than that of either of the two given measurements.

According to a particular aspect of the invention the detector means includes an arrangement of pickup coils to sense the alternating magnetic field wherein first and second coils for the given two measurements are placed on either side of axial line and one or more coils for the third of the measurements is or are arranged in a common plane between the first and second coils.

According to another aspect of the invention there is provided a method of detection of an inaccessible metallic object carrying an alternating current comprising traversing a region in the vicinity of the object with a detector having at least three temporally or spatially separate response channels, comparing the outputs from two outer channels to determine the location at which the field strength detected by the two channels is equal and comparing the output of a channel intermediate between the outer channels with the output of the outer channels to determine whether the field strength detected by the intermediate channel is greater or less than the field strength detected by the outer channels and generating a first indication if it is greater and a second indication if it is less.

Preferably the measurements are made in a frequency band between 20 KHz and 80 KHz.

DESCRIPTION OF THE DRAWINGS

An embodiment of the invention will now be described by way of example, with reference to the accompanying drawings in which:

FIG. 1 shows diagrammatically a buried distribution system detector apparatus in accordance with the invention.

FIG. 2 shows diagrammatically, and not to scale, the disposition of pickup coils for use in the apparatus of FIG. 1, and FIG. 3 is a block schematic diagram of electronic circuitry suitable for processing signals derived from the pickup coils of FIG. 2.

DETAILED DESCRIPTION OF THE PREFERRED EMBODIMENT

Referring now to FIG. 1 of the drawings, a transmitter 1 includes a power supply and an alternating current oscillator. This is tuned to a frequency of 43 KHz, a frequency which has been found to be relatively free of background electrical noise. In a preferred arrangement where, for example, it is desired to detect separately two buried pipes 3 which are close together, the transmitter is coupled to a loop coil radiator 2 having its axis disposed vertically as shown so that, in use, it generates a simple dipole magnetic field having its axis vertical whereby, with the radiator 2 located above and between the two pipes 3, alternating currents will be induced in opposite directions in each pipe. The resultant magnetic field arising from the interaction of the field from each pipe 3 is of such a form that the detector (to be described later) will identify the presence of the two pipes. In an alternative arrangement, if only a single buried pipe is known to exist, then it is possible to use the loop coil radiator 2 with its axis horizontal. In either case, the operation of the detector is the same. A receiver/detector 5 has four pickup coils 6a–6d arranged with their axes horizontal to minimize response to direct radiation from the transmitter. The receiver 5 has a visual display 7 to indicate the position of maximum field strength detected by the pickup coils. Alternatively, or additionally, this indication could be indicated by audible means.

The arrangement for the four pickup coils is shown in greater detail in FIG. 2. All four coils have their axes horizontal and are disposed in pairs 6a, 6b and 6c, 6d along centre lines X—X and Y—Y respectively. The outputs of the outer coils 6a, 6b will be equal when those coils are positioned at equal distances from a point of maximum or minimum field strength. Alternatively, a single coil positioned intermediately between the two coils 6a, 6b could be employed to determine whether the field strength at that point was greater or less than field strength at the two outer coils, and hence whether the point was at a field maximum or minimum. Preferably however, by employing two intermediate coils 6c, 6d arranged vertically above one another, greater discrimination between maximum and minimum field strength can be obtained by comparing the outputs of coils 6c and 6d, in an appropriate manner to be described later, with the output signal from either coil 6a or 6b. In the arrangement shown in FIG. 2, 40 percent of the output from the upper coil 6d is subtracted from the output of the lower coil 6c. The resultant signal is the normalized by amplifying it by a factor 1.67.

As indicated in FIG. 3, the outputs from the two intermediate coils 6c, 6d are fed to a subtractor and amplifier circuit 21. The outputs of the two outer coils 6a, 6b are fed directly to equal-gain first and second amplifiers 22, 23, to constitute first and second channels A, B, respectively. The output of the subtractor and amplifier circuit 21 is fed to a third amplifier 24 of identical gain to that of the first and second amplifiers to constitute a third channel C. The output of each amplifier is fed by way of a 43 KHz filter circuit 25-27 to a time division multiplexer 28 which is controlled by a clock pulse generator 29. The multiplexed signal is fed to a variable gain amplifier 30 and thence to a demodulator 31 and a demultiplexer 32, also controlled by the clock pulse generator 29.

The output from the first and second channels A, B of the demultiplexer 32 is fed to a level comparator and threshold detector 33 which is connected in a feedback loop to control that gain of the variable gain amplifier 30, thus serving as an automatic gain control to maintain the mean value of the outputs from the first and second channels to between an upper and a lower predetermined limit.

The demodulator 31 converts the multiplexer alternating current signal to a DC voltage proportional to the amplitude of the input to each channel. The outputs from channels A and B of the demultiplexer 32 are compared in a first comparator circuit 34. If they are equal to within a preset tolerance, a signal is passed to an AND gate 35. If the channels are not equal, no output signal is produced. A second comparator 36 compares the outputs of channels A and B and passes the larger signal to a third comparator 37 where it is compared with the output from channel C. Provided the output of channel C is greater than the output of both channels A and B (i.e., the field strength is a maximum), a signal is passed to the AND gate 35. If the channel C output is less than that of either channel A or channel B, no output signal is produced.

When output signals from the first and third comparators 34, 37 are present at the AND gate 35, a readout device 38 indicates to the operator that a field strength maximum has been detected.

It will be appreciated that various modifications may be made without departing from the ambit of the invention. For example, in the circuit described, frequency division multiplex could equally readily have been employed instead of time division multiplex. Alternatively, a non-multiplexed three-channel system with an automatic gain control signal derived from a single channel could be substituted. Also, the amplification factor applied by the variable gain amplifier 30 may be derived from any combination of two or more of the channels.

The spacing between the two intermediate coils 6c, 6d along Y—Y could be varied, and the proportion of the output of the upper coil 6d which is subtracted from that of the lower coil 6c could be varied provided adjustments were made to the gain of the normalising amplifier. Similarly, it is possible to vary the spacing of the coils 6a, 6b along X—X relative to the chosen spacing of the intermediate coils 6c, 6d. Also, either or both pairs of coils 6a, 6b or 6c, 6d could be symmetrically or assymmetrically disposed about the respective centre lines Y—Y or X—X.

The invention has been described with reference to signals produced by spatially separate pickup coils. As an alternative, measurements could be made by a common set of pickup coils and a compensating time delay introduced in the signals to produce the effect of spatially separate pickup coils.

A three channel system is the simplest, but a greater number of channels could be employed with a corresponding matching of the signal pickup to expected field strength distribution.

The invention is, furthermore, not limited to the detection of subterranean distribution systems, but may also be applied, for example, to the detection of service lines buried in buildings.

The receiver described is of compact contruction and may conveniently be mounted, complete with pickup coil assembly, in a portable casing.

We claim:

1. Detector means for locating an elongated metallic object through which an alternating electrical current is passing, thereby producing an alternating magnetic field therearound, said detector means including first, second and third magnetic field strength measuring means, said first and second magnetic field strength measuring means being positioned in a common plane which is perpendicular to a plane passing through the third magnetic field strength measuring means and said first and second magnetic field strength measuring means being equidistant from said plane passing through said third magnetic field strength measuring means and on opposite sides thereof, first comparator means electrically connected to said first and second magnetic field strength measuring means to determine when the magnitudes of the field strengths measured thereby are equal, second comparator means electrically connected to said first and second magnetic field strength measuring means to determine the larger field strength measurement therebetween, third comparator means electrically connected to said third magnetic field strength measuring means and said second comparator means to determine when the field strength measurement from said third magnetic field measuring means is greater than the larger of the field strength measurements between the first and second magnetic field strength measuring means, and indicator means electrically connected to said first comparator means and said third comparator means to indicate when the field strengths measured by the first and second magnetic field strength measuring means are equal and when the field strength of the third magnetic field strength measuring means is greater than the larger of the field strengths measured by either of said first and second magnetic field strength measuring means, said indicator means thus indicating when the detector means has been positioned such that the plane passing through said third magnetic field strength measuring means is coincident with a plane in which the elongated metallic object is located.

2. The detector means of claim 1 wherein said first and second magnetic field strength measuring means comprise first and second pickup coils which have their axes coaxially aligned along an imaginary line.

3. The detector means of claim 2 wherein said third magnetic field strength measuring means comprises third and fourth pickup coils, the axis through each of said third and fourth pickup coils being aligned with the imaginary line passing through said first and second pickup coils, and said third and fourth pickup coils being equally spaced from said common plane which passes through said first and second pickup coils and on opposite sides thereof.

4. The detector means of claim 3 wherein said first and second pickup coils have similar electrical characteristics.

5. The detector means of claim 4 wherein said third and fourth pickup coils have similar electrical characteristics, said third pickup coil intended to be positioned closer to said elongated matallic object than said fourth pickup coil.

6. The detector means of claim 5 including means for subtracting a predetermined percentage of the output signal from said fourth pickup coil from the output signal from said third pickup coil to produce a resultant signal, and then amplifying said resultant signal.

7. The detector means of claim 6 wherein said predetermined percentage is 40% and the amplifying factor is 1.67.

8. The detector means of claim 1 wherein a common variable gain amplifier is electrically connected between said first, second and third magnetic field strength measuring means and said first, second and third comparator means.

9. The detector means of claim 8 including a multiplexer means electrically connected between said first, second and third magnetic field strength measuring means and said variable gain amplifier.

10. The detector means of claim 9 wherein said multiplexer means is a time division multiplexer.

11. The detector means of claim 9 wherein said multiplexer means is a frequency division multiplexer.

12. An apparatus for locating an elongated metallic object, said apparatus including a transmitter means capable of emitting an alternating magnetic field and thus inducing an alternating electric current in a nearby elongated metallic object; and a detector means, said detector means including first, second and third magnetic field strength measuring means, said first and second magnetic field strength measuring means being positioned in a common plane which is perpendicular to a plane passing through the third magnetic field strength measuring means and said first and second magnetic field strength measuring means being equidistant from said plane passing through said third magnetic field strength measuring means and an opposite sides thereof, first comparator means electrically connected to said first and second magnetic field strength measuring means to determine when the magnitudes of the field strengths measured thereby are equal, second comparator means electrically connected to said first and second magnetic field strength measuring means to determine the larger field strength measurement therebetween, third comparator means electrically connected to said third magnetic field strength measuring means and said second comparator means to determine when the field strength measurement from said third magnetic field measuring means is greater than the larger of the field strength measurements between the first and second magnetic field strength measuring means, and indicator means electrically connected to said first comparator means and said third comparator means to indicate when the field strengths measured by the first and second magnetic field strength measuring means are equal and when the field strength of the third magnetic field strength measuring means is greater than the larger of the field strengths measured by either of said first and second magnetic field strength measuring means, said indicator means thus indicating when the detector means has been positioned in alignment with the plane in which the elongated metallic object is located.

13. The apparatus of claim 12 wherein said transmitter means includes a power supply, and an alternating current oscillator which operates at a frequency in the range of 20 KHz to 80 KHz.

14. The apparatus of claim 13 wherein said transmitter means operates at a frequency in the range of 40 KHz to 50 KHz.

15. The apparatus of claim 14 wherein said transmitter means operates at a frequency of about 43 KHz.

16. A method for detecting the presence and location of an elongated metallic object which carries an alternating electrical current and thus has an alternating magnetic field therearound, said method comprising positioning in a region near the expected vicinity of the elongated metallic object a detector means which includes first, second and third magnetic field strength measuring means, said first and second magnetic field strength measuring means being positioned in a common plane which is perpendicular to a plane passing through the third magnetic field strength measuring means and said first and third magnetic field strength measuring means being equidistant from said plane passing through said third magnetic field strength measuring means and on opposite sides thereof, and traversing the region near the elongated metallic object until the output signals from the first and second magnetic field strength measuring means are equal and less than the output signal from said third magnetic field strength measuring means, the location of said detector means indicating the plane in which the elongated metallic object is located.

* * * * *